United States Patent [19]

Oishi et al.

[11] 3,945,459

[45] Mar. 23, 1976

[54] COLLISION SENSING SYSTEM FOR VEHICLES

[75] Inventors: Kazuo Oishi, Oobu; Takashi Yamada, Anjo; Takeshi Matsui, Kariya, all of Japan

[73] Assignee: Nippon Soken, Inc., Nishio, Japan

[22] Filed: July 23, 1973

[21] Appl. No.: 381,386

[30] Foreign Application Priority Data
July 26, 1972  Japan.............................. 47-75402
Feb. 12, 1973  Japan.......................... 48-19027[U]
Feb. 20, 1973  Japan.......................... 48-22633[U]
Mar. 31, 1973  Japan.......................... 48-39472[U]

[52] U.S. Cl.............. 180/91; 73/517 R; 180/103 A; 280/150 AB; 324/174
[51] Int. Cl.²....................................... B60R 21/02
[58] Field of Search........ 180/91, 103; 280/150 AB; 324/174, 179; 73/517 R; 335/306

[56] References Cited
UNITED STATES PATENTS

| | | | |
|---|---|---|---|
| 2,978,599 | 4/1961 | Wilcox............................... | 324/174 |
| 3,243,692 | 3/1966 | Heissmeier...................... | 324/174 X |
| 3,252,024 | 5/1966 | Louden.............................. | 324/174 |
| 3,421,080 | 1/1969 | Lightcap............................ | 324/179 |
| 3,703,300 | 11/1972 | Gillund.......................... | 280/150 AB |
| 3,745,392 | 7/1973 | Phoenix.......................... | 324/173 X |
| 3,792,874 | 2/1974 | Ayres............................ | 280/150 AB |
| 3,794,136 | 2/1974 | Okada..................... | 280/150 AB X |

FOREIGN PATENTS OR APPLICATIONS
933,173  9/1955  Germany........................... 324/174

OTHER PUBLICATIONS

Goretzki, IBM Tech. Disclosure, Vol. 13, No. 9, Feb./1971, p. 2579.
Mazzeo, "Instruments & Control Systems," Vol. 39, No. 6, June/1966, pp. 125–126.

*Primary Examiner*—M. H. Wood, Jr.
*Assistant Examiner*—Terrance L. Siemens
*Attorney, Agent, or Firm*—Cushman, Darby & Cushman

[57] ABSTRACT

A collision sensing system for vehicles is provided in which a moving core shaft having alternately notched and projecting portions formed thereon or a permanent magnet serving as a moving core and magnetized to create therein alternate north and south poles is disposed to move relative to a stator for providing a magnetic path, whereby when a vehicle comes into collision, the magnetic reluctance of the magnetic path is caused to change rapidly at plural times and a generating winding wound on the stator thus generates the waveform of an output voltage proportional to the rate of the plurality of changes of the magnetic reluctance. This output voltage is compared with a predetermined value to determine, whether a controlled system such as an air bag should be actuated to thereby actuate the controlled system properly.

5 Claims, 33 Drawing Figures

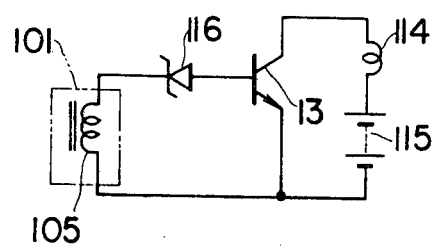
FIG. 6
FIG. 7
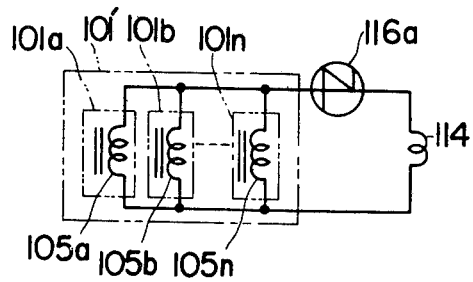
FIG. 8
FIG. 9
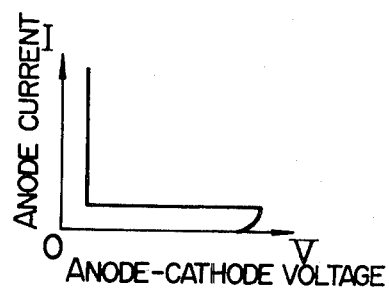
FIG. 10
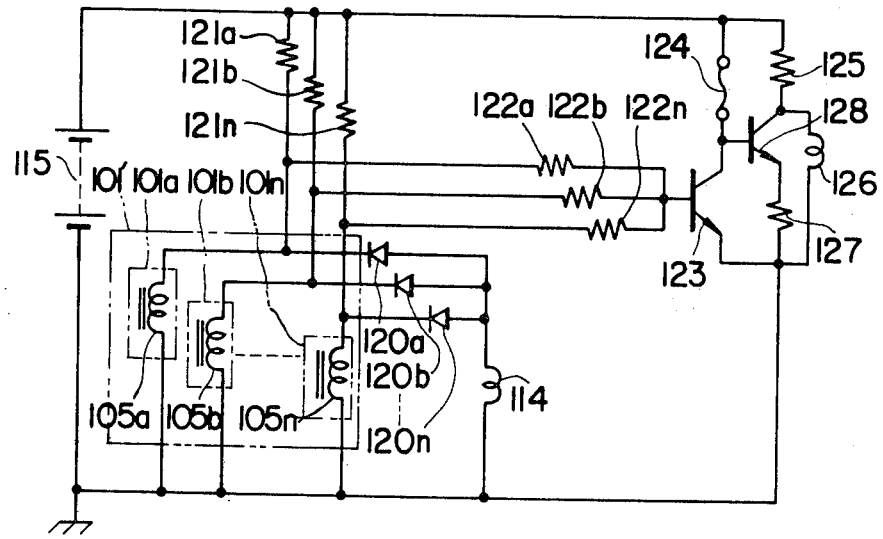

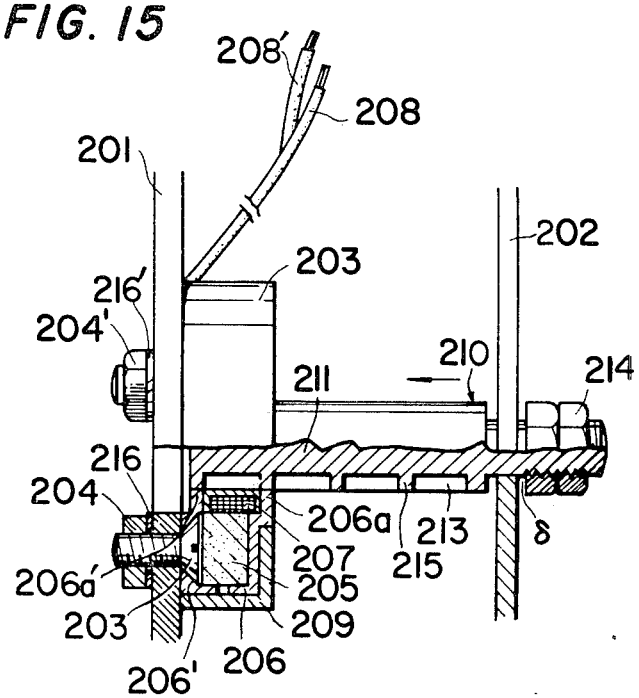
FIG. 15
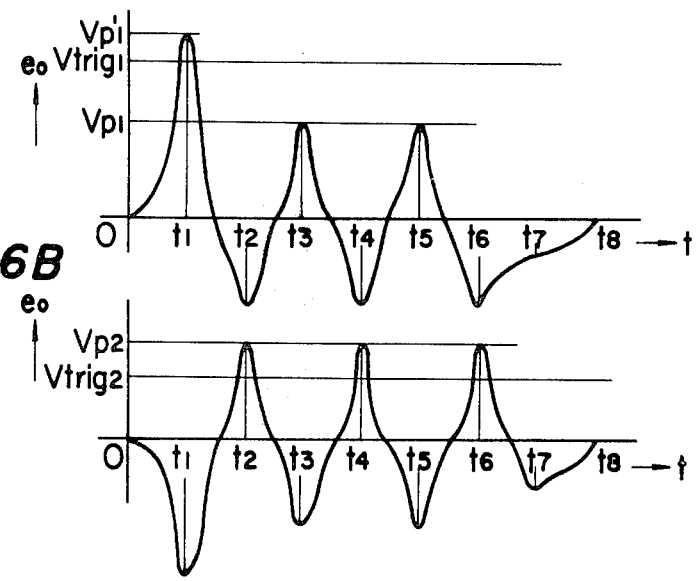
FIG. 16A
FIG. 16B

COLLISION SENSING SYSTEM FOR VEHICLES

The present invention relates to a collision sensing system which is designed so that when a vehicle, particularly an automotive vehicle collides with an object, the system senses and determines whether the collision is of a dangerous nature, whereby a controlled system such as an occupant protecting device is promptly actuated upon the occurrence of a dangerous collision to protect the occupants of the vehicle.

In a known type of collision sensing system, a gravity sensor is for example employed in which an iron weight of the pendulum type is held stationary by a magnet and the deceleration of a vehicle is sensed when the weight is separated from the magnet thus closing the contacts. A drawback of such a sensing system is that if the gravity sensor is disposed on an impact receiving face of a vehicle, there is a possibility that the gravity sensor may be caused to operate erroneously by any impact other than a collision and it is extremely difficult to determine whether the magnitude of an impulsive acceleration or deceleration produced by the collision of the vehicle is of so dangerous a nature that an occupant protecting system such as an air bag must be actuated. Further, if such a gravity sensor is disposed at the rear of the vehicle, e.g., under the back seat, a considerable time will be required before the gravity sensor senses a deceleration after the occurrence of a collision with a result that the detection of the collision cannot serve the purpose of protecting the occupants. While, in another known type of collision sensing system, a radar sensor or the like is employed so that a sudden approach of a vehicle to another vehicle is detected to preliminarily predict the occurrence of a collision, this system is also disadvantageous in that even a slight collision tends to cause the sensor to get out of position thus making it entirely useless or causing it to break down, and moreover the system is expensive.

With a view to solving the foregoing difficulties, it is an object of the present invention to provide a collision sensing system for vehicles which comprises a stator for providing a magnetic path and a moving core movable relative to the stator to change the magnetic reluctance of the magnetic path and thereby cause a generating winding to generate a voltage corresponding to the rate of change of the magnetic reluctance. When this collision sensing system is installed in a vehicle, its output voltage, produced upon collision of the vehicle may be compared with a predetermined value to determine, in accordance with the impact of the collision and in a short period of time, whether a controlled system is to be actuated and in this way the controlled system may be properly actuated. Furthermore, when the impact of a collision of the vehicle is relatively low, the collision sensing system will not be destroyed so that the sensing system returns to its initial state upon restoration of that portion of the vehicle where the sensing system is installed and thus the sensing system can be conditioned for the next collision.

It is another object of the present invention to provide a generating-type collision sensing system for vehicles which comprises a detector including magnetic pole pieces, a magnet and a coil constituting a magnetic circuit and adapted to generate a voltage in accordance with the variation of the magnetic reluctance, and a shaft movable relative to the magnetic pole pieces to change the magnetic reluctance of the magnetic circuit, wherein a guide means consisting of a non-magnetic material is provided to permit the movement of the shaft with a uniform gap between the shaft and the pole pieces to ensure accurate detection of the magnitude of an impulseive impulsive or deceleration caused by the occurrence of a collision.

It is a further object of the present invention to provide a collision sensing system for vehicles which comprises a detector including a magnet, a stator provided with salient poles constituting the magnetic path of the magnet and a generating winding disposed within the stator, and a shaft provided with alternately projecting and notched magnetic portions adapted to face the salient poles of the stator. Upon the occurrence of a collision, the shaft moves relative to the salient poles so as to cause the generating winding to generate a voltage corresponding to the colliding speed in accordance with the change of the magnetic reluctance caused by the movement of the shaft. Prior to the movement of the shaft relative to the salient poles of the stator, the salient poles of the stator and the projecting portions of the shaft constituting low magnetic reluctance portions are arranged so they do not face each other, whereby during the movement of the shaft caused by the yielding of the bumper upon collision, a plurality of cycles of the opening and closing of the magnetic path are repeated, producing each time a voltage accurately corresponding to the speed at that instant and thereby ensuring a positive detection of a rapid deceleration due to a collision.

It is a still further object of the present invention to provide a collision sensing system for vehicles which comprises a detecting section including a magnet, north and south magnetic pole pieces having salient poles constituting the magnetic path of the magnet and a coil disposed within the pole pieces, and a shaft having a magnetic body portion so that upon the occurrence of a collision the salient poles of the detecting section and the magnetic body portion of the shaft are caused to move relative to each other in accordance with the colliding speed thus causing the coil to generate a voltage corresponding to the colliding speed in accordance with the change in the magnetic reluctance caused by the relative movement of the salient poles and the magnetic body portion. The magnetic body portion of the shaft is formed with alternately projecting and notched portions occurring at predetermined periodic intervals, and the distance between the salient poles of the detecting section is made different from the distance between the adjacent projecting portions, whereby a voltage proportional to the relative speed of the detecting section and the shaft is generated to ensure accurate detection of the speed upon the occurrence of a collision in accordance with the magnitude of the generated voltage.

The vehicle collision sensing system according to the present invention thus has a remarkable advantage in that the acutation of a controlled system can be determined in a short period of time in accordance with the impact of collision of a vehicle to thereby ensure proper actuation of the controlled system wherein the sensing system is simple in construction and inexpensive to manufacture.

In accordance with these objects and many other objects an embodiment of the present invention comprises a collision sensing system for a vehicle which comprises a magnet and a coil, whereby by virtue of the magnetic force of the magnet, a plurality of changes in the potential difference across the ends of the coil occur during a time interval between the beginning and the end of a collision of the vehicle.

Other objects and advantages of the present invention will become readily apparent from considering the following detailed description in conjunction with the accompanying drawings, in which:

FIG. 6 is an electric wiring diagram showing a first invention of the system of this embodiment;

FIG. 7 is an electric wiring diagram showing a second embodiment of the system of this invention;

FIG. 8 is an electric wiring diagram showing a third embodiment of the system of this invention, employing a plurality of collision sensors;

FIG. 9 is a static characteristic diagram of the PNPN diode employed in the embodiment of the invention shown in FIG. 8;

FIG. 10 is an electric wiring diagram showing a fourth embodiment of this invention, which is capable of detecting a fault in the generating windings;

FIG. 15 is a partial sectional view of a collision sensing system for explaining the system of this invention;

FIG. 16A is a characteristic diagram showing the output voltage waveform generated during a collision by the collision sensing system shown in FIG. 15;

FIG. 16B is a characteristic diagram showing the output voltage waveform generated during a collision by the collision sensing system of this invention shown in FIG. 13;

Figure 1:
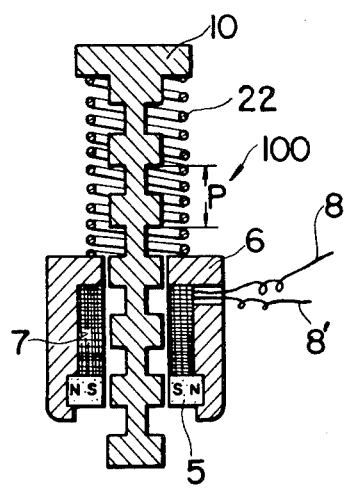
FIG. 1 is a longitudinal sectional view showing a basic form of a collision sensing system according to the present invention.
Figure 2:
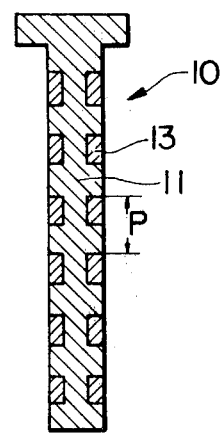
FIG. 2 is a longitudinal sectional view showing a modified form of the principal part of the collision sensing system of FIG. 1.

The present invention will now be explained in greater detail with reference to the illustrated embodiments. Referring first to FIG. 1 showing in longitudinal section the basic form of a collision sensing system 100 of the present invention, numeral 5 designates a permanent magnet, numeral 6 designates a stator for providing a magnetic path, 10 a moving core shaft relatively movable within the stator 6 to change the magnetic reluctance of the magnetic path. Numeral 7 designates a generating winding for generating a voltage in accordance with the relative speed of the stator 6 and the moving core shaft 10. Numeral 22 designates a spring for returning the moving core shaft 10 to its initial position. If the moving core shaft 10 is secured to the bumper, the spring 22 may be eliminated. When a vehicle equipped with the collision sensing system 100 of FIG. 1 comes in collision, as will be explained later, the moving core shaft 10 is caused, as for example by the bumper of the vehicle, to move in a direction that compresses the spring 22 relative to the stator 6 which is securely mounted on the vehicle body, thereby changing the magnetic reluctance of the magnetic path of the stator 6. When this occurs, an output voltage proportional to the rate of change per unit time of the magnetic flux corresponding to the change in the magnetic reluctance is generated between output terminals 8 and 8' of the generating winding 7. This output voltage is the product of the number of turns in the generating winding 7 and the change in the magnetic flux and therefore it is proportional to the relative speed of the stator 6 and the moving core shaft 10. The moving core shaft 10 is formed with projections and notches so that the core shaft 10 changes the magnetic reluctance of the magnetic path of the stator 6 as it is moved relative to the stator 6. In this case, there is possibility that even a slight inclination of the moving core shaft 10 may cause it to be caught by the stator 6. To prevent this, the notched portions of the moving core shaft 10 may be filled with a nonmagnetic material as shown in FIG. 2 in which numeral 11 designates a magnetic material and numeral 13 designates a nonmagnetic material such as aluminum or resin. If aluminum is employed, the shaft may be produced by a die-casting process, while a molding process may be used for resinous material.

Figure 3:
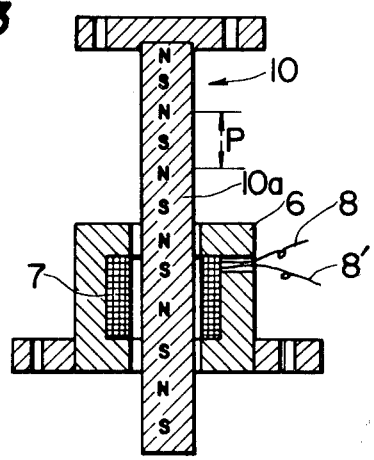
FIG. 3 is a longitudinal sectional view showing another modification of the collision sensing system shown in FIG. 1.

FIG. 3 shows a modified form of the collision sensing system 100 in which the moving core shaft 10 comprises a permanent magnet 10a which is magnetized to create therein alternate north and south poles which are spaced away from each other to provide the optimum conditions for the formation of the magnetic path of the stator 6. In other words, they are arranged so that when the north pole is positioned in the upper magnetic path, the south pole is positioned in the lower magnetic path. This collision sensing system 100 may be mounted on a vehicle in such a manner that the stator 6 is secured to the vehicle body and the forward end of the moving core shaft 10 is secured to the bumper.

Figure 4:
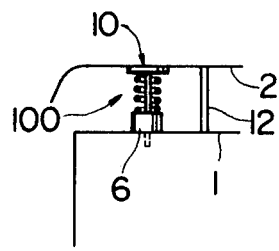
FIG. 4 is a schematic plan view showing one form of mounting the collision sensing system of this invention on a vehicle.
Figure 5:
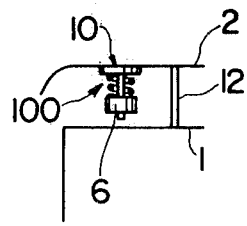
FIG. 5 is a schematic plan view shown another form of mounting the collision sensing system of this invention on a vehicle.

FIGS. 4 and 5 show different forms of mounting the above-described collision sensing system 100 on a vehicle at a position between a vehicle body 1 and a bumper 2 attached to the body 1 by a fastening stay 12. FIG. 4 shows one form of the mounting in which the end of the moving core shaft 10 is placed in contact with or secured to the bumper 2 and the stator 6 is secured to the body 1, therefor FIG. 5 shows another form of the mounting in which the end of the moving core shaft 10 is secured to the bumper 2 and the stator 6 is held in suspension.

In operation, when the vehicle equipped with the collision sensing system 100 as shown in FIG. 1 comes into collision, a rapid deceleration (hereinafter referred to as an acceleration in a sense that there is a change in the speed) of the bumper occurs. In this case, the body 1 retains the same speed as the vehicle itself, while the bumper 2 is rapidly accelerated to reach the relative speed itself of the body 1 and the colliding object and thereafter it starts to move toward the body 1 at substantially the same speed as the relative speed of the colliding object and the body 1. Consequently, the collision sensing system 100 reaches the relative speed of the colliding object and the body 1 in a very short period of time after which it generates a voltage proportional to this relative speed. This voltage remains on until the bumper 2 comes to a standstill by for example coming into contact with the body 1, so that during the time interval between the beginning and the end of movement of the bumber 2, one cycle of A.C. voltage is generated every time the moving core shaft 10 travels the distance of one pitch P.

On the other hand, when the vehicle equipped with the collision sensing system 100 as shown in FIG. 5 comes into collision, the bumper 2 starts to move rapidly toward the body 1. Thus, the same effect as the arrangement of FIG. 4 can be obtained and at the same time the sensing system 100 shown in FIG. 5 can serve as an acceleration sensor by virtue of the fact that the stator 6 is held in suspension.

FIGS. 6, 7 and 8 show first to third embodiments of the collision sensing system of this invention comprising the above-described sensing system 100 and an igniting circuit for an air bag.

Referring first to FIG. 6 which shows the first embodiment of this invention, the valve actuating mechanism for actuating the valve of an air bag serves as a detecting means which detects a predetermined value of the output voltage generated from a collision sensing circuit 101 which is equivalent to the sensing system 100. This valve actuating mechanism comprises an igniting filament 114, a power supply battery 115, a Zener diode 116 for detecting a threshold voltage constituting the predetermined value of the output voltage of the sensing circuit 101 and a transistor 113. When the sensing circuit 101 generates a voltage corresponding to the impact of a collision upon collision of the vehicle and when this generated voltage is higher than the threshold voltage of the Zener diode 116, the transistor 113 is rendered conductive and thus a current flows into the transistor 113 through the filament 114 from the power supply battery 115. As a result, the filament 114 is heated to red heat to set off the explosive and thereby to open the valve of the air bag.

Further, the transistor 113 may be replaced with a thyristor 113a as in the embodiment shown in FIG. 7.

Furthermore, in the actual application, if the detection of movement of the vehicle bumper is effected at one position only, there is the possibility of a failure to detect. To overcome this difficulty, as in the third embodiment shown in FIG. 8, the sensing circuit 101' may be mounted at each of a plurality of positions on the bumper as well as at any other portions of the vehicle body so that when any one of the outputs of a plurality of collision sensors 101a, 101b, . . . , and 101n is higher than a predetermined level, this output is detected. In the circuit of FIG. 8, the collision sensors 101a, 101b, . . . , and 101n are connected in parallel with each other. In this arrangement, since each of generating windings 105a, 105b, . . . , and 105n of the respective sensors has its own inductance, there is practically no possibility of the output voltage of one collision sensor being affected by the generating winding of other collision sensors, and moreover the output voltage of the collision sensors can be made sufficiently large so that the filament 114 may be heated to red heat to perform its function satisfactorily without using the power supply battery 115 and the transistor 113.

In the third embodiment shown in FIG. 8, a PNPN diode 116a having a characteristic shown in FIG. 9 is used in place of the Zener diode 116 shown in FIGS. 6 and 7. Further, by suitably designing the sensing circuit 101' and the filament 114, the PNPN diode 116a may be eliminated. In other words, the PNPN diode 116a may be eliminated by designing the sensing circuit 101' so that when the time density of electric energy generated by the generating winding 105 of the sensing circuit 101 and consumed by the filament 114 exceeds the igniting threshold for the filament 114, the explosive is set off. In this way, electric energy of a density necessary for ignition can be applied to the filament at the minimum colliding speed requiring the actuation of the air bag.

The fourth embodiment shown in FIG. 10 further comprises a fault detecting circuit for the plurality of collision sensors 101a, 101b, . . . , and 101n. In FIG. 10, numerals 120a, 120b, . . . , and 120n designate diodes for preventing mutual interference between the generating windings 105a, 105b, . . . , and 105n. 121a, 121b, . . . , and 121n, are resistors for supplying the required biasing current for detecting a fault in the generating windings 105a, 105b, . . . , and 105n, respectively. 122a, 122b, . . . , and 122 n, resistors for preventing the flow of current to a fault detecting transistor 123 by the output voltage of the generating windings 105a, 105b, . . . , and 105n. 124 is a fuse which is adapted to melt when the fault detecting transistor 123 becomes conductive. 128 is a blown fuse detecting transistor for the fuse 124 which is normally in a conductive state. Numeral 125 designates a load resistor of the blown fuse detecting transistor 128 and 127 is a base current limiting resistor of the transistor 128 while 126 is a warning lamp.

With the construction described above, when at least any one of the collision sensors 101a, 101b, . . . , and 101n generates an AC voltage upon the occurrence of a collision, the corresponding one of the diodes 120a, 120b, . . . , and 120n is caused to conduct during the negative half wave of the AC voltage thereby energizing the filament 114 and thereby setting off the explosive. On the other hand, when a fault occurs in any one of the generating windings, e.g., the generating winding 105b, almost all of the current flowing through the resistor 121b now flows through the resistor 122b and the base of the fault detecting transistor 123, so that the fault detecting transistor 123 is rendered conductive to melt the fuse 124. As a result, the blown fuse detecting transistor 128 is rendered nonconductive and thus the current flowing through the load resistor 125 now flows into the warning lamp 126. This turns on the warning lamp 126 thereby detecting and indicating the fault in the generating winding 105b. In this way, the occurrence of fault in at least one of the plurality of the generating windings 105a, 105b, . . . , and 105n can be detected. In this arrangement, the diodes 120a, 120b, . . . , and 120n may be replaced with capacitors.

Assuming now that the relative speed of the moving core shaft 10 and the stator 6 is 36 km/h, then there is the relative movement of 10 m/sec. or 10 mm/msec. Therefore, if the pitch P of the moving core shaft 10 is 10 mm, then one cycle of AC voltage is generated during the time interval of 1 msec.

The advantages of the embodiments of this invention so far described are summarized as follows:

Firstly, owing to the fact that the relative speed itself which occurs during collision is converted into a voltage, it is possible to predict the magnitude of an acceleration (deceleration) that will be eventually exerted on the occupants by detecting the output of the collision sensing system 100.

Secondary, the collision sensing system 1 has a sufficient power of restitution to return to its initial condition without affecting itself after the occurrence of a collision in a manner that would damage it.

Thirdly, the provision of a very simple voltage detector such as the Zener diode 116 or the provision of only an amplifier such as the transistor 13 is only required between the sensing system 100 and the actuator, i.e., the filament 114, etc.

While, in the embodiments of the invention described above, the collision sensing system is used in the operation of an air bag, it is possible, for example to produce an arrangement so that a thyristor is turned on by the output voltage of the sensing system and a suitable controlled system such as a seat belt locking device is connected to the output (anode) of the thyristor.

Figure 11:
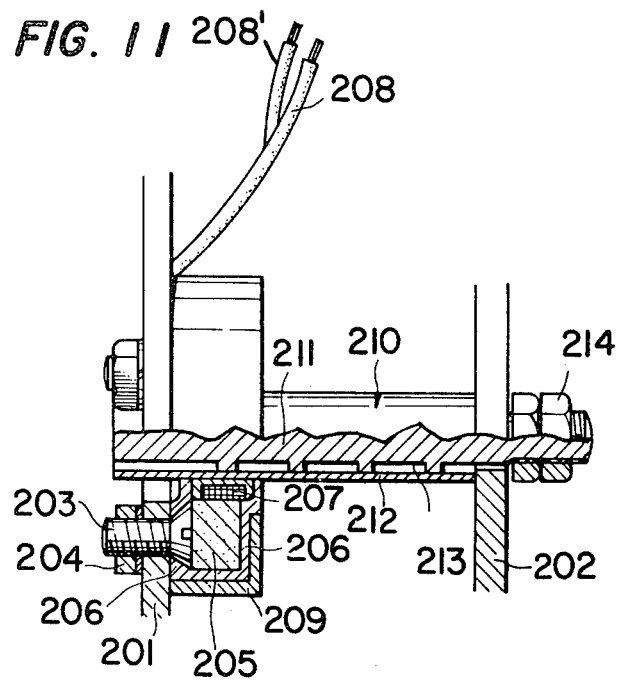
FIG. 11 is a cross-sectional view showing a manner in which the collision sensing system of this invention is mounted between the body portion and the bumper of a vehicle.

FIG. 11 is still another embodiment of the invention in which the collision sensing system is mounted between the body portion of a vehicle and the bumper. In FIG. 11, numeral 201 designates the body portion of a vehicle, 202 a bumper, 203 a fastening screw, 204 a fastening nut, 205 a magnet, 206 pole pieces which constitute the magnetic circuit of the magnet, 207 a coil that links the magnetic circuit. The coil 207 forms, along with the magnet 205 and the pole pieces 206, a detector for generating a voltage in accordance with the variation of the magnetic reluctance. Numeral 208 designates lead wires so that the output voltage is generated across the terminals. Numeral 209 designates a cover of nonmagnetic material for securely enclosing the magnet 205, pole pieces 206 and coil 207, 210 a shaft, 211 a magnetic body of the shaft 210 which is formed with notches and projections with a predetermined pitch. Numeral 212 designates a guide consisting of a layer of nonmagnetic material disposed on the surface of the shaft 210 to provide a uniform gap between the shaft 210 and the pole pieces 206. Numeral 213 designates a nonmagnetic material filled in the notched portions of the shaft 210, 214 nuts connecting the shaft 210 and the bumper 202 together so that the shaft 210 may move simultaneously along with the movement of the bumper 202 upon occurrence of a collision. When the bumper 202 collides with an object, the shaft 210 is moved in the direction of the arrow so that the number of magnetic flux linked with the coil 207 changes with a period dependent on the pitch of the notched and projected portions formed in the shaft 210, thereby producing a voltage across the terminals of the lead wires 208. The required speed detection can be effected in accordance with this output voltage. In this speed detection, if a voltage level detector is used as will be described later, a Zener diode is used to detect whether the input voltage level has reached the voltage level corresponding to a preset speed so that a signal is generated at the instant when this voltage level is reached.

Figure 13:
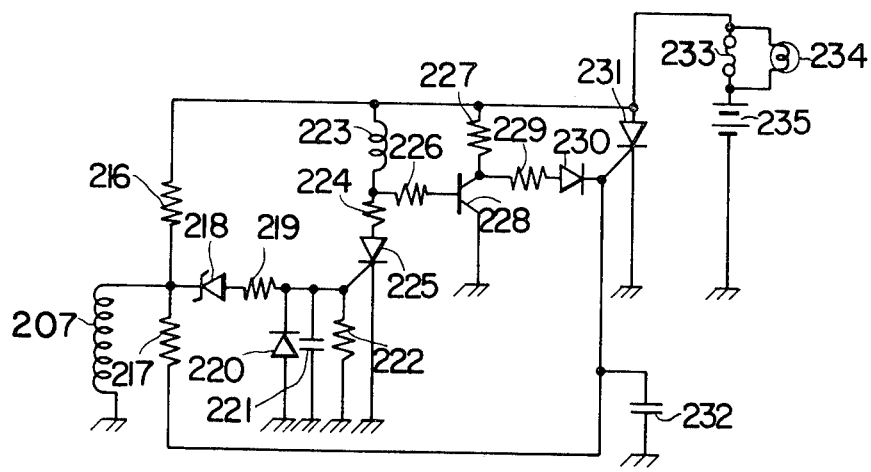
FIG. 13 is a circuit diagram of the voltage level detector used with this invention.

FIG. 13 shows a circuit diagram of a voltage level detector that can be used with the present invention. In FIG. 13, numeral 207 designates the coil of the collision sensing system which is connected to the input terminal of the circuit. The input voltage level is examined so that when the input voltage is higher than a predetermined voltage, a current is supplied through a Zener diode 218 to the gate of a thyristor 225 to turn it on. This ignites a filament 223 and actuates an occupant protecting device. A resistor 222 and a capacitor 221 are provided to examine the frequency characteristic of input voltage, and a diode 220 is provided to prevent the negative alternation of input voltage from causing the thyristor 225 to become nonconductive. Further, the resistance value of a resistor 224 is selected so that a fuse 233 melts after the thyristor 225 has been rendered conductive and the filament 223 has been blown. While the voltage of a battery 235 is applied to the gate of a thyristor 231 through resistors 216 and 217, in the normal conditions the potential at the gate of the thyristor 231 is practically at zero volt since the internal resistance of the coil 7 is very small. When a fault occurs in the coil 7 so that the potential rises supplying a current to the gate of the thyristor 231, the thyristor 231 is turned on and thus the fuse 233 melts to turn on a lamp 234. A capacitor 232 is provided to absorb the charge when the collision sensing system comes into operation and generates a voltage. In this way, when the input voltage rises, it is prevented from supplying a current to the gate of the thyristor 231 and thus causing the thyristor 231 to conduct. When a fault occurs in the filament 223, the transistor 228 which has previously been placed in a conductive state now becomes nonconductive, supplying a current to the gate of the thyristor 231 through the resistors 227 and 229 and the diode 230. This causes the thyristor 231 to conduct and thus the fuse 233 melts to turn on the lamp 234. The resistor 224 is provided so that when the input voltage reaches the predetermined voltage level, the fuse 233 will not melt to prevent the flow of current to the filament 223 before the thyristor 225 becomes conductive and the filament 223 is ignited to set off the explosive. In other words, the detection of fault is effected only after the occurrence of a fault in the ignited filament 223 and thereafter the fuse 233 is blown to prevent the supply of power from the battery 235.

Figures 12A, 12B:
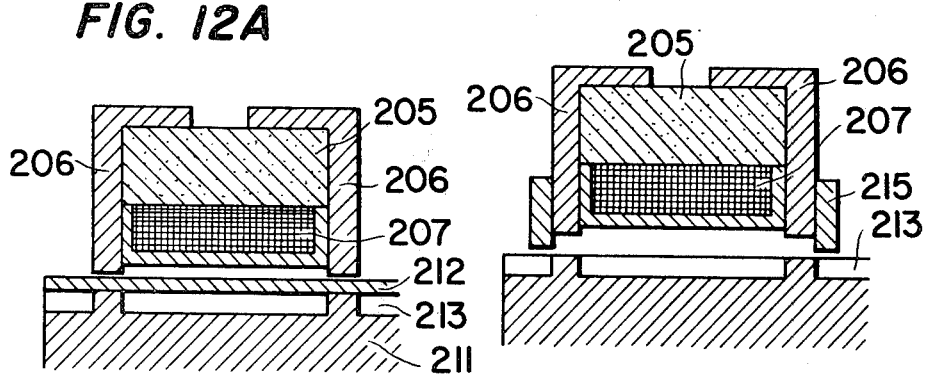
FIGS. 12A, 12B and 12C are sectional views showing various forms of the magnetic circuit portion of the system of the present invention.
Figures 12C, 12D:
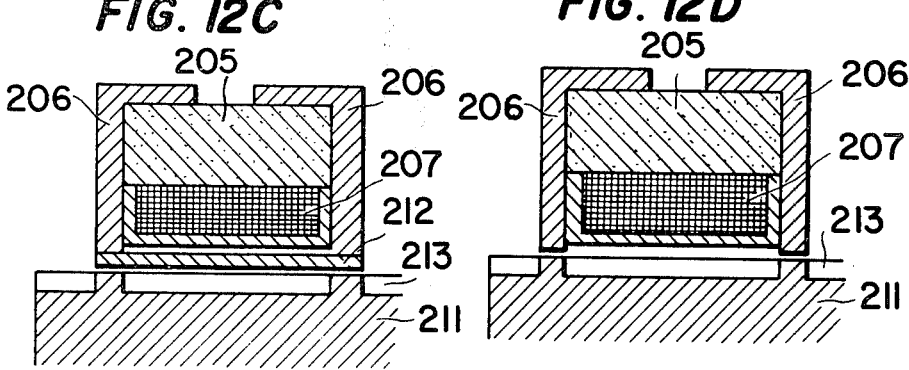
FIG. 12D is a sectional view of another form of the magnetic circuit portion for explaining the collision sensing system of this invention.

FIGS. 12A to 12D are enlarged views of the coil 207 and its adjacent portions. In FIG. 12A, a guide consisting of a layer of the nonmagnetic material 212 is applied on the shaft 210, while in FIG. 12B a nonmagnetic guide 215 is provided on each of the pole pieces 206. In FIG. 12C, a guide consisting of the nonmagnetic layer 212 is provided on the side of the pole pieces 206. In FIG. 12D, no guide member of nonmagnetic material is used.

Figure 14A:
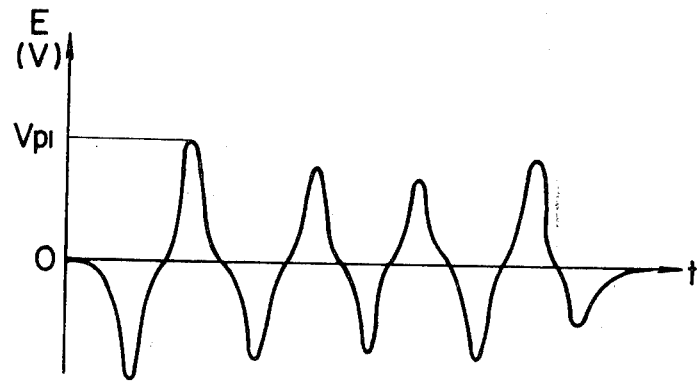
FIGS. 14A and 14B are characteristic diagrams showing the generated voltage waveforms of the coils in different systems.
Figure 14B:
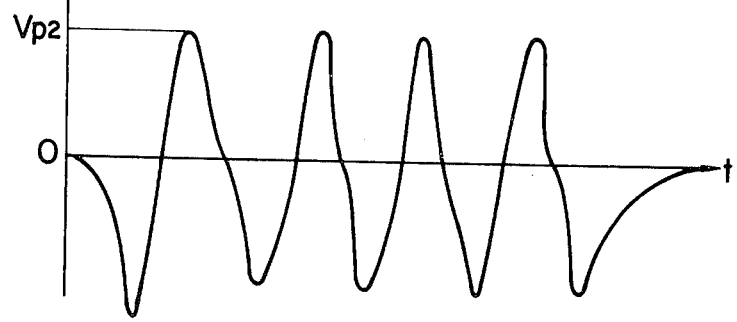

Thus, as shown in FIGS. 12A to 12C, by providing a guide consisting of a layer of nonmagnetic material on the surface of the shaft 210, providing each of the pole pieces 206 with a guide consisting of a nonmagnetic material or applying a guide consisting of a uniform layer of nonmagnetic material on the side of the pole pieces 206, the shaft 210 may be caused to move with a practically uniform gap around the magnetic circuit portion. In this way, when the speed is constant, the voltage level of the respective peak values can be made equal and therefore it is possible to effect accurate speed detection in accordance with the voltage level of the peak values. FIG. 14A shows the voltage waveform generated upon collision when no guide is provided between the shaft 210 and the pole pieces 206 as shown in FIG. 12D, while FIG. 14B shows the voltage waveform generated with the arrangements shown in FIGS. 12A to 12C. It will be seen from FIG. 14B that in the collision sensing system of this invention, the generated voltage has a constant peak value.

This generated voltage is coupled to the previously described voltage level detecting section so that the filament 223 of the ignition circuit is ignited when the applied voltage is higher than the predetermined voltage level.

In an example of the experiments conducted using the circuit of FIG. 13, the component values were as follows: the resistor 216 = 1 kilo-ohm, resistor 217 = 330 ohms, Zener diode 218 = 7 volts, resistor 219 = 100 ohms, capacitor 221 = 6800 $\mu$F, resistor 222 = 1 kilo-ohm, resistor 224 = 2 ohms, resistor 226 = 22 kilo-ohms, resistor 227 = 2 kilo-ohms, resistor 229 = 2 kilo-ohms, capacitor 232 = 100 $\mu$F, and fuse 233 = 2A.

The voltage waveform generated across the terminals of the lead wires during collision will also be affected by the relative position of the projection of the magnetic body portion of the shaft with respect to the salient poles of the stator. This relationship will be explained with reference to FIG. 15. FIG. 15 is a sectional view of a collision sensing system for explaining the vehicle collision sensing system of the present invention shown in FIG. 11. FIG. 15 is identical with FIG. 11 excepting that the detecting section and the shaft changed places.

In FIG. 15, numeral 201 designates a sensing system mounting plate on the body portion of a vehicle, 202 a bumper fastened to the front of the vehicle, 203 a fastening screw, 204 and 204' lock nuts, 205 a generating permanent magnet composed of a ferrite magnet, for example, 206 a stator 206' a stator constituting the detector side magnetic path with the stator 206, 206a and 206b the respective tip portions of the stators 206 and 206', 207 a generating coil, 208 and 208' the output lines of the generating coil from which the generated output is delivered. Numeral 209 designates an outer cover made of a nonmagnetic material, 210 a shaft movable in the direction of the arrow during collision, 211 the magnetic material in the shaft 210 which is formed with notches and projections with a predetermined pitch. Numeral 213 designates nonmagnetic portions with high magnetic reluctance which are disposed on the surface of the shaft 210, 214 double lock nuts for locking the shaft 210 to the bumper 202, 215 the projections with low magnetic reluctance which are formed on the magnetic body portion of the shaft 210. Numerals 216 and 216' designate spring washers.

With the construction described above, when a collision occurs, the shaft 210 is moved in the direction of the arrow in FIG. 15, thus generating an output. Prior to the collision, the output potential difference between the output lines 208 and 208' is 0 volt. When the shaft 210 starts moving upon occurrence of collision, the magnetic flux $\phi$ linked with the generating coil decreases. In this case, if the output line 8' becomes positive with respect to the output line 208, a positive alternation builds up during a time period from the time $t = 0$ to $t = t_1$ as shown in FIG. 16A. Before collision, the output potential difference is 0 volts as mentioned earlier, and in the initially set condition, two of the projections 215 on the magnetic portion of the shaft 210 are located respectively opposite to the salient poles 206a and 206a' of the stators 206 and 206', respectively. In other words, the shaft 210 is resting at a position that provided the closed magnetic path with the maximum flux $\phi$. Consequently, the differential coefficient of the magnetic flux $\phi$ at this position in respect to a position X is given as $$\frac{d\phi}{dX} = 0.$$

The output voltage $$e = \frac{d\phi}{dt}$$

and $$e = \frac{d\phi}{dt} = \frac{d\phi}{dX} \cdot \frac{dX}{dt} = \frac{d\phi}{dX} \cdot V$$

(where $$V = \frac{dX}{dt}$$

and $V$ represents the speed). Therefore, assuming that the speed V is constant, that position which gives the condition $$\frac{d\phi}{dt} = 0$$

corresponds to the position where the voltage of the generated waveform is 0. If the rise of the voltage starts in this condition and if the speed of the moving shaft 210 is assumed constant, then subsequently a constant output voltage waveform should always be generated. In fact, however, it has been customary to use an inexpensive soft iron as the magnetic material of the shaft and moreover such soft iron has been subjected to cutting processes without any preliminary treatment. Therefore, in the stationary conditions prior to the occurrence of collision, the magnetic domains have already been formed in the magnetic material of the shaft. As a result, a considerably large change occurs in the magnetic flux passing through the generating coil 207 during the time interval in which the shaft moves from the position shown in FIG. 15 and the next two projections on its magnetic body portion to face the salient poles 206a and 206a' of the stators and the voltage level of the second and subsequent peaks of the output voltage drop to a lower level as shown in FIG. 16A. This may be due to the fact that in terms of the hysteresis curve, the curve which initially shows a large loop, shifts to a smaller hysteresis curve on the second and subsequent AC cycles. Thus, after the second cycle, the hysteresis curve becomes stable and traverses a smaller loop producing a constant output voltage. In this way, the output voltage waveform as shown in FIG. 16B is obtained. In this case, however, this vehicle collision sensing system does not generate constant AC voltage while the shaft 210 is moving at a constant speed during collision, that is, it generates a voltage whose voltage level is high during the initial period of collision but drops to a lower level subsequently. Therefore, if the detection of voltage level is effected in reference to a predetermined voltage level $V_{trig}$ in an electronic circuit following the vehicle collision sensing system, the following inconvenience results. Considering first the case in which the value of $V_{trig}$ is preset to effect the detection in accordance with the first peak value of output voltage, if, for example, the bumper 202 causes an colliding object to yield slightly and then comes into contact with the inelastic portion of the colliding object, an output voltage is generated whose first peak value is lower than the second and subsequent peak values. Consequently, the detection of colliding speed is effected in accordance with the second peak value and thus there results an inconvenience that the detected output voltage level is low as compared with the actual colliding speed and thus the impact of collision is underrated mistakenly. On the other hand, if the detection is effected in accordance with the second or any subsequent peak value, then the collision of the bumper 202 with an object having an inelastic surface gives rise to an inconvenience that a collision at a very low speed would be mistaken for a violent collision. If we can attribute this to the arrangement of FIG. 15 in which the setting is made in the magnetically stable condition of the shaft 210, i.e., in the situation where the shaft 210 is about to stop spontaneously, the foregoing difficulty can be overcome by an arrangement in which no projections on the magnetic body portion of the shaft face the salient poles of the stators when the shaft is at rest as shown in the embodiment of the vehicle collision sensing system of the invention shown in FIG. 11. In other words, in the arrangement of FIG. 11 the distance between the mounting plate 201 on the body portion and the bumper 202 is predetermined. Therefore, in this preset position, the projections on the magnetic body portion of the shaft 210 are located at those positions where they do not face the salient poles 206a and 206a' of the stators. In this way, the foregoing difficulty can be overcome by virtue of the following two facts during collision:

1. Prior to the commencement of movement of the shaft upon occurrence of a collision, most of the magnetic flux of the permanent magnet 205 flows through end portions 206a and 260a' of the stators 206 and 206', respectively, and the magnetic flux scarcely flows through the projection 215 on the magnetic body portion of shaft 210. When the shaft 210 starts moving under the effect of a collision, the magnetic flux $\phi$ flowing through the projections 215 on the magnetic body portion of the shaft 210 changes to the direction which increases it. This results in $d\phi/dt > 0$. Therefore, if, as in the case of FIG. 16A, the output line 208' becomes positive with respect to the output line 208 when the magnetic flux $\phi$ decreases, a negative alternation of the output voltage begins to build up as shown in FIG. 16B. Then, by the time when the moving shaft 210 comes to a speed $d\phi/dt < 0$, the hysteresis curve has already been traversing a small stable loop and thus no particularly large peak value of the voltage is generated. Thereafter, as shown in FIG. 16B, the constant peak values of the output voltage are generated at times $t_2$, $t_4$ and $t_6$.

2. Further, in the initial setting, no projections 215 on the magnetic portion of the shaft 210 are facing the salient poles 206a and 206a' of the stators and thus most of the magnetic flux of the permanent magnet 205 flows through the end portions 206b and 206b'. Therefore, the magnetic flux scarcely flows through the projection 215 on the magnetic body portion of the shaft 210. Consequently, almost no magnetic domain is formed in the magnetic body portion of the shaft 210 and the hysteresis curve traverses a steady and stable loop from the very beginning. As a result, all of the peak values of the output voltage are maintained at a constant value $V_{p2}$ as shown in FIG. 16B.

Figure 17:
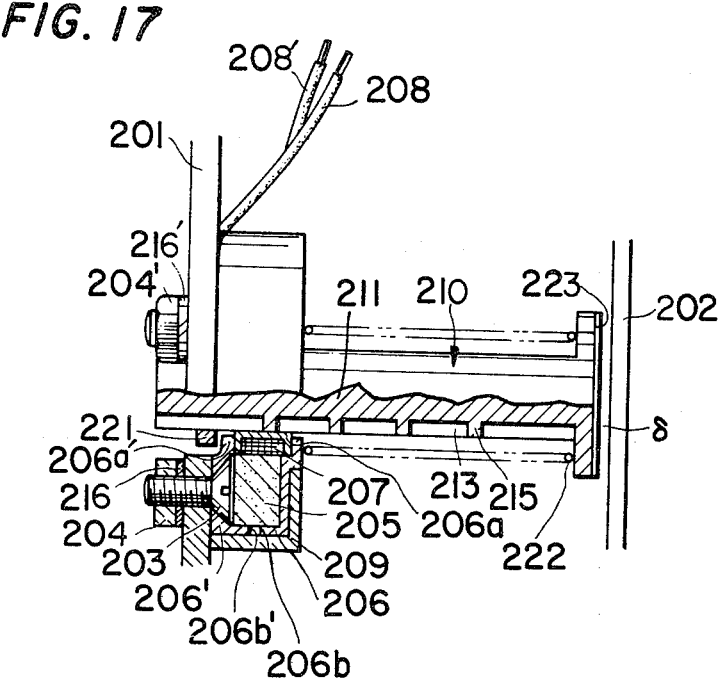
FIG. 17 is a partial sectional view showing a further embodiment of the collision sensing system of the present invention.

FIG. 17 shows another embodiment of the present invention. In FIG. 17, a gap $\delta$ is provided between the bumper 202 and the shaft 210 and a spring 222 is provided to pull the shaft 210 toward the bumper 202. A stopper ring 221 of nonmagnetic material is also provided to limit the movement of the shaft 210 toward the bumper 202. When a collision occurs, the bumper 202 first travels the gap $\delta$ and then it comes into contact with a damper 223 which is made of a material such as rubber, foam styrene or fiber and which is applied on the bumper side flange of the shaft 210. The subsequent operation of this embodiment is the same with that of the embodiment shown in FIG. 11.

The circuit shown in FIG. 13 may be employed for the detection of the output voltage of the vehicle collision sensing system shown in FIGS. 15 and 17, respectively.

Figure 18:
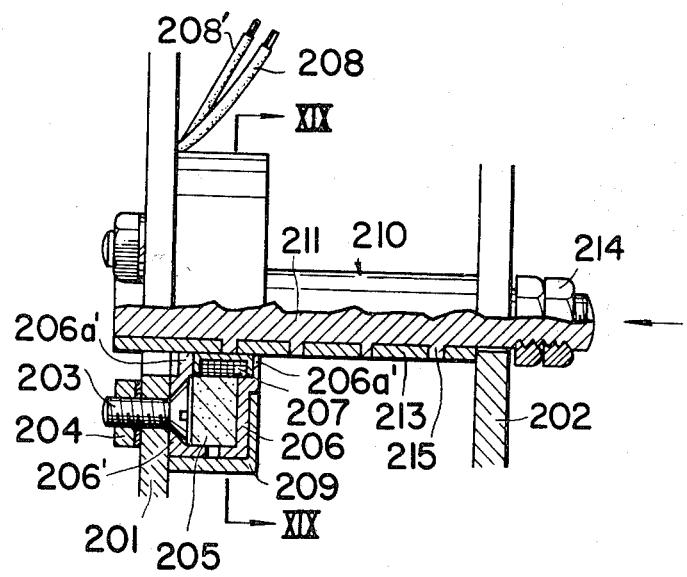
FIG. 18 is a partial sectional view showing a still further embodiment of the collision sensing system of the present invention.
Figure 19:
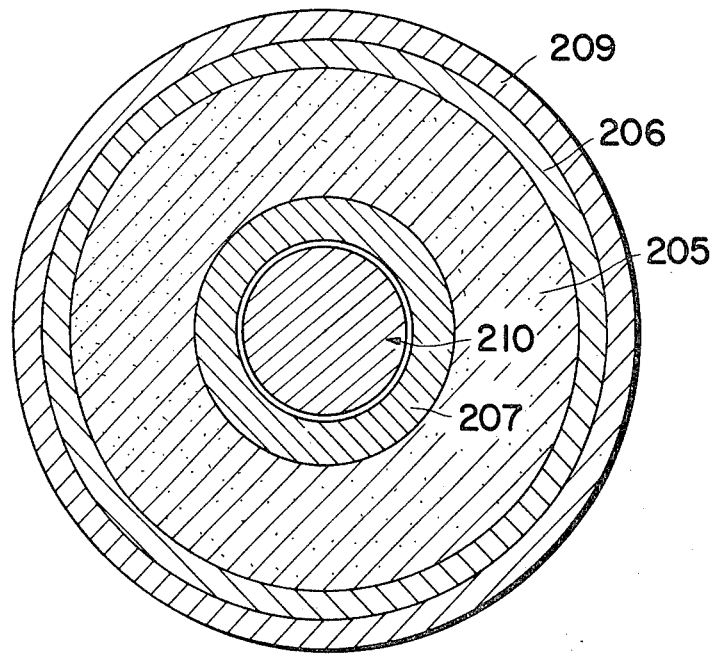
FIG. 19 is a cross-sectional view taken along the line XIX—XIX of the system shown in FIG. 18.

FIG. 18 shows still another embodiment of the collision sensing system of this invention. In FIG. 18, numeral 201 designates a portion of a vehicle body and a detecting section comprising a magnet 205, pole pieces 206 and 206', a coil 207 and a case 209 is fastened to the body portion 201 by means of screws 203 and nuts 204. Numeral 210 designates a shaft fastened to a vehicle bumper 202 by means of nuts 204. The shaft 210 comprises a magnetic body portion 211 formed with projections 215 and a nonmagnetic material filled in the notches between the projections 215. The same reference numerals as used in FIG. 11 designate the identical parts. Thus, this embodiment is identical with the embodiment of FIG. 11 excepting that the distance between the adjacent projections 215 on the magnetic body portion differs from that between the north and south poles 206a and 206a' of the pole pieces 206 and 206' of the magnet 205. FIG. 19 is a section taken along the line XIX—XIX of the system shown in FIG. 18.

The operation of this vehicle collision sensing system during collision is as follows. When the bumper 202 is moved under the effect of collision, the shaft 210 is also moved. When this occurs, the detecting section mounted on the body portion 201 and the shaft 210 move relative to each other so that the magnetic reluctance of the magnetic circuit formed by the magnet 205, pole pieces 206 and 206' and magnetic body portion 211 of the shaft 210 changes. Consequently, the amount of magnetic flux passing through the magnetic body portion 211 changes and thus a voltage corresponding to the relative speed of the detecting section and the shaft 210 is generated across the output lines 208 and 208' of the coil 207 linked with the magnetic flux. The circuit shown in FIG. 13 may be used as a circuit for effecting the required detection in accordance with the output voltage of the sensing system.

Figure 21:
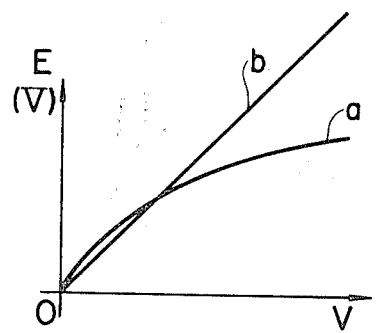
FIG. 21 is a characteristic diagram showing the relationship between the colliding speed and generated voltage in the collision sensing system of this invention.
Figure 20A:
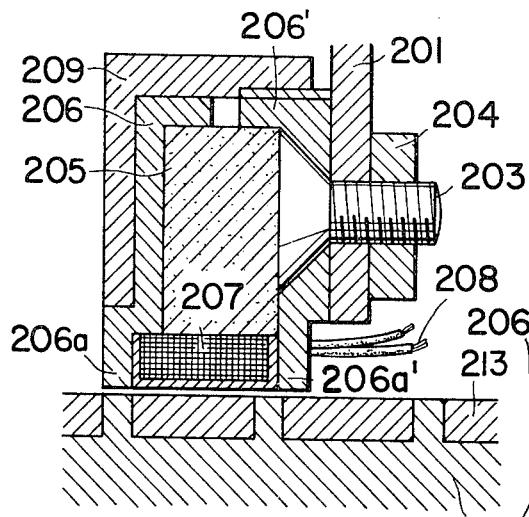
FIGS. 20A, 20B and 20C are longitudinal sectional views showing various forms of the detecting section constituting the principal part of the collision sensing system of the present invention.
Figure 20B:
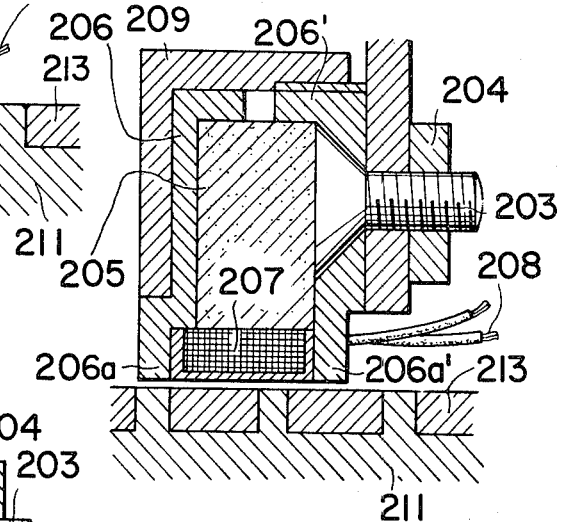
Figure 20C:
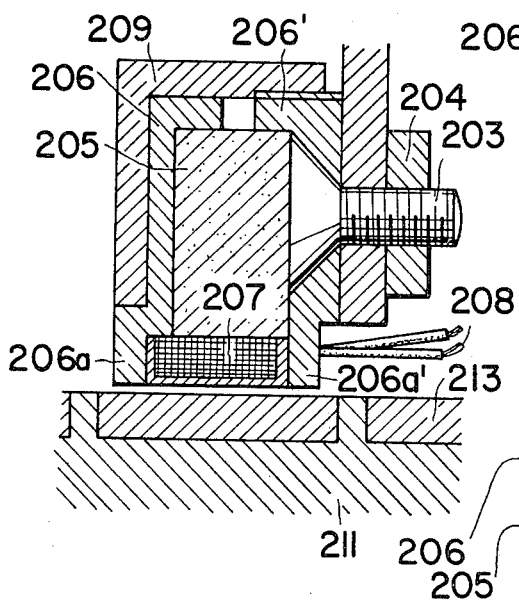
Figure 20D:
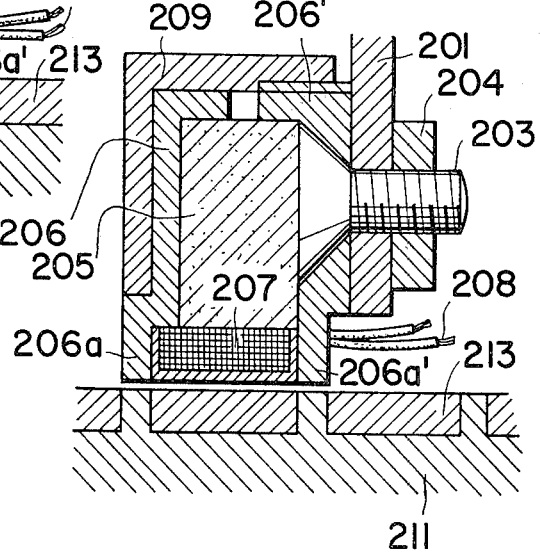
FIG. 20D is a longitudinal sectional view of a detecting section for explaining the system of this invention.
Figure 22A:
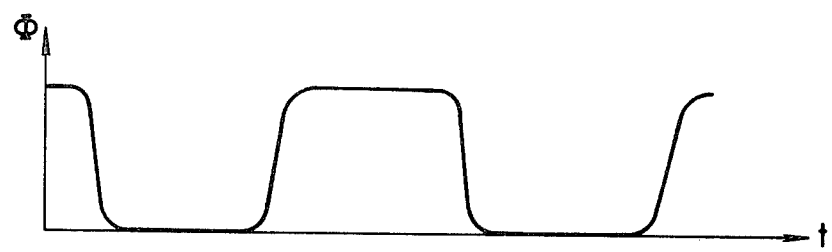
FIGS. 22A and 22B are characteristic diagrams showing respectively the magnetic flux and generated voltage in the vehicle collision sensing system used in explaining the present invention.
Figure 22B:
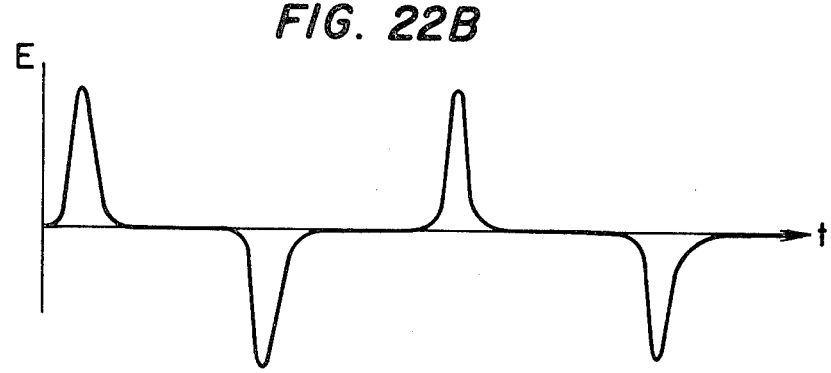

Now consider the operation of a vehicle collision sensing system employing the detecting section shown in FIG. 20D wherein the distance between the adjacent projections 215 of the magnetic body portion 211 is the same with that between the salient poles 206a and 206a' of the pole pieces 206 and 206'. In this system, as shown at a in FIG. 21, the rate of change of the output voltage E with respect to the rate of change of the speed V decreases with increase in the speed V. Consequently, if the speed for indicating the presence of collision is set within the region in which the rate of change of the output voltage decreases, it inevitably results in an increased error in the detection of collision. The reason for the fact that a directly proportional relationship between the speed V and the output voltage E cannot be maintained over a wide range, may be explained in the following way. The magnetic flux through the magnetic body portion 211 changes as shown by the rectangular waveform in FIG. 22A and it includes the harmonic components. In this case, if the changes in the flux are rapid, i.e., the colliding speed is high, then the resultant output voltage also includes the harmonic components as shown in FIG. 22B and moreover such harmonic components have high frequencies that cannot be generated as the output voltage. Therefore, it is impossible to ensure a one-to-one linear relationship between the colliding speed and the output voltage and therefore the curve as shown at a in FIG. 21 results. The physical reasons for this fact may be attributable to the eddy current loss and poor magnetic frequency follow-up characteristic.

Figure 22C:
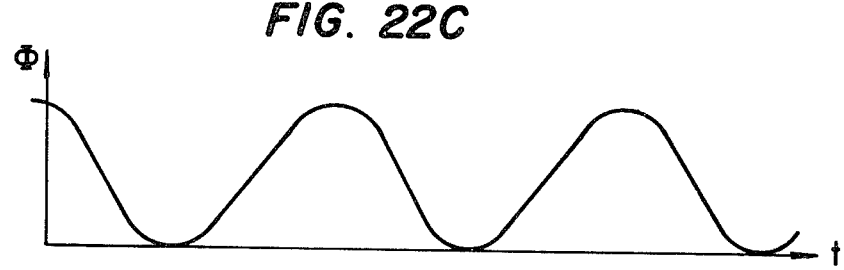
FIGS. 22C and 22D are characteristic diagrams showing respectively the flux and the output voltage generated in the vehicle collision sensing system of this invention.
Figure 22D:
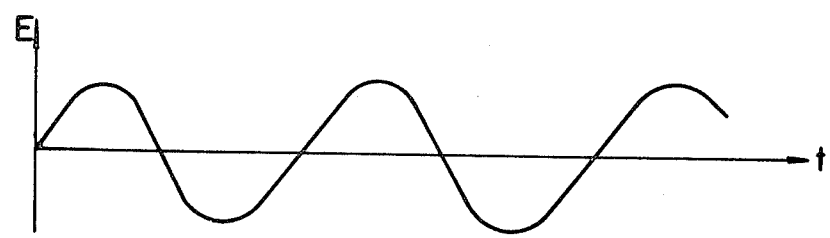

However, if the distance between the salient poles 206a and 206a' of the detecting section differs from that between the adjacent projections 215 of the shaft 210 as shown in FIGS. 20A, 20B and 20C, then the changes in the magnetic flux through the magnetic body portion 211 during collision become smooth as shown in FIG. 22C and therefore the fundamental harmonic component can be increased. Such output voltage is shown in FIG. 22D. As a result, the attenuation in the high frequency range due to the higher harmonics can be reduced and therefore the relationship between the speed and the output voltage at relatively high colliding speeds can be linearly changed as shown at b in FIG. 21. Further, such linear changes at these high frequencies permit a decreased error in the speed detection in the saturation region shown at a in FIG. 21 in the detection of a collision that would endanger the occupants of a vehicle.

What is claimed is:

1. A collision sensing system mounted on a vehicle for detecting the occurrence of a collision comprising: a coil, at least one magnet mounted on a magnetic stator means together with said coil, and a shaft movable through said coil in response to a collision, at least one of said shaft and said stator being fixedly secured to said vehicle wherein said shaft moves with respect to said stator when said vehicle accelerates, said shaft being made of magnetic material and having means for changing the flux linking said coil when said shaft moves with respect to wherein the movement of said shaft with respect to said stator causes a plurality of potential changes across said coil during a time interval between the beginning and the end of the acceleration of the vehicle, wherein when the rate of said potential changes exceeds a predetermined value of collision is detected, said plurality of potential changes inhibiting a spurious potential from causing an indication of a collision.

2. The collision sensing system of claim 1, wherein said means for changing the flux linking said coil when said shaft moves with respect to said stator includes a plurality of notches and projections around the periphery thereof.

3. A collision sensing system according to claim 2, wherein said magnetic stator means is provided with salient poles longitudinally spaced with respect to the axis of said shaft, and further comprising a guide means comprising a non-magnetic material secured to either of said salient poles and said shaft to thereby cause said shaft to move at a uniform distance from said salient poles.

4. A collision sensing system mounted on a vehicle for detecting the occurrence of a collision comprising: a coil mounted on a magnetic stator means, and a shaft movable through said coil in response to a collision, at least one of said shaft and said stator being fixedly secured to said vehicle wherein said shaft moves with respect to said stator when said vehicle accelerates, said shaft being magnetized to create therein a plurality of alternate north and south poles, wherein the movement of said shaft with respect to said stator causes a plurality of potential changes across said coil during a time interval between the beginning and the end of said collision of the vehicle.

5. A collision sensing system according to claim 4, wherein said stator magnet means has a hollow circular shape, said coil being received in said hollow portion of said magnet, and said shaft extending through said coil.

* * * * *